United States Patent
Kou et al.

(10) Patent No.: US 7,377,432 B2
(45) Date of Patent: May 27, 2008

(54) INTERFACE CONVERTING APPARATUS

(75) Inventors: Wallace Kou, Los Altos, CA (US); Chang-Lung Lu, Jhubei (TW); Sheng-I Hsu, Changhua Hsien (TW)

(73) Assignee: Siliconmotion Inc., Hsinchu County (TW)

( * ) Notice: Subject to any disclaimer, the term of this patent is extended or adjusted under 35 U.S.C. 154(b) by 21 days.

(21) Appl. No.: 11/436,576

(22) Filed: May 19, 2006

(65) Prior Publication Data
US 2007/0080224 A1 Apr. 12, 2007

(30) Foreign Application Priority Data
Aug. 17, 2005 (TW) .............. 94128100 A

(51) Int. Cl.
*G06K 7/06* (2006.01)
(52) U.S. Cl. .............. 235/441; 235/492; 710/16
(58) Field of Classification Search .............. 235/441, 235/492; 710/16
See application file for complete search history.

(56) References Cited

U.S. PATENT DOCUMENTS

| 6,516,398 | B2 * | 2/2003 | Hwang ............... 711/202 |
| 7,162,549 | B2 * | 1/2007 | Mambakkam et al. ....... 710/16 |
| 2006/0216999 | A1 * | 9/2006 | Hsiao ................ 439/630 |

FOREIGN PATENT DOCUMENTS

TW M254673 1/2005

* cited by examiner

*Primary Examiner*—Michael G. Lee
*Assistant Examiner*—Allyson N Trail
(74) *Attorney, Agent, or Firm*—Rosenberg, Klein & Lee

(57) ABSTRACT

An interface converting apparatus that converts signals between a Secure Digital (SD) card and a Memory Stick Pro (MS Pro). The apparatus comprises a SD memory card interface, a MS Pro memory card interface, an address decoder and a micro controller. The micro controller is able to convert a memory address from the MS Pro memory card interface into a memory address needed by the SD memory card interface and vice versa, and the address decoder can then be used to access the data via the SD memory card interface or the MS Pro memory card interface.

16 Claims, 3 Drawing Sheets

INTERFACE CONVERTING APPARATUS

RELATED APPLICATIONS

The present application is based on, and claims priority from, Taiwan Application Serial Number 94128100, filed Aug. 17, 2005, the disclosure of which is hereby incorporated by reference herein in its entirety.

BACKGROUND

1. Field of Invention

The present invention relates to an interface converting apparatus for miniature memory cards. More particularly, the present invention relates to an interface converting apparatus used to convert interface signal standards between a Secure Digital (SD) card and a Memory Stick Pro (MS Pro), or between a Multi Media Card (MMC) and a MS Pro.

2. Description of Related Art

Progress in manufacturing techniques for electronic devices have resulted in many kinds of portable electronic devices with more powerful functions and smaller volumes. For example, a large variety of functions are implemented in personal digital assistants (PDA) and mobile phones. As a result, each of these devices can almost be used as a miniature computer. An increased number of functions in portable electronic devices require larger memory space to store many kinds of data.

A basic method for increasing memory space is to extend the internal memory of the portable electronic device. But small volume portable electronic devices have space limitations that limit internal memory expansion; therefore, external memory extending interfaces are implemented on the portable electronic devices to enable the devices to connect to external memory modules.

Therefore, many kinds of external miniature memory cards have entered the market. Different miniature memory cards have different characteristics. Secure Digital (SD) card and Memory Stick Pro (MS Pro) are two kinds of commonly used miniature memory cards. Additionally, the Multi Media Card (MMC) interface standard is also compatible with SD cards.

The SD card is a memory card standard developed by SanDisk (U.S.A.), Matsushita Electronic (Japan) and Toshiba (Japan) together. The SD card is one of the most popular miniature memory cards because it has a smaller volume, diversified additional functions such as Secure Digital Music Initiative (SDMI) used to effectively protect stored data, high data access speed and a low cost. The SD card may be used in many kinds of intelligent digital information applications, such as digital cameras, MP3 players and PDA.

The MS Pro is a memory card standard developed by SONY (Japan). Although the MS Pro is not inferior to the SD card in volume, data access speed and function, the cost of the MS Pro is much higher than the SD card because the MS Pro is an exclusive SONY standard of. The MS Pro is generally used in electronic devices developed by SONY.

SONY electronic devices still have a high market share, and the many users of SONY electronic devices can only use the expensive MS Pro memory modules to extend the memory space of their electronic device. Therefore, if a converting apparatus can be used to enable a SD card to be used in electronic devices that only have a MS Pro interface, the user can have more choices in memory card selection and the cost of the memory card can be further reduced.

Therefore, an apparatus for mutually converting data standards between a SD card and a MS Pro is needed in practice.

SUMMARY

It is therefore an objective of the present invention to provide an interface converting apparatus that can convert interface standards between a SD card and a MS Pro.

It is another objective of the present invention to provide an interface converting apparatus used to reduce the usage cost of memory cards.

It is still another objective of the present invention to provide a memory unit with a SD card, and the memory unit can be used in an electronic device with MS Pro interface.

To achieve the foregoing and other objectives, an interface converting apparatus comprises a MS Pro interface, a SD card interface, an address decoder and a micro-controller. The MS Pro interface is connected to another apparatus with a MS Pro interface and the SD card interface is connected to another apparatus with a SD card interface. When one of the memory card interfaces (source interface) desires to access data via the other memory card interface (object interface), the address decoder first obtains a source memory address which is conformable to the standard of the source interface from the source interface. The micro-controller is used to convert the source memory address into an object memory address which is conformable to the standard. The address decoder is used to access data via the object interface according to the object memory address.

According to another embodiment of the present invention, to improve the efficiency in practical operation, a program read only memory (program ROM) is connected to the micro-controller, and a program random access memory (program RAM), a data random access memory (data RAM) and a buffer connected to the address decoder may be used in the interface converting apparatus. The program ROM is used to store the necessary code to support the operation of the micro-controller. The program RAM and the data RAM are used to temporarily store the temporary code and the temporary data generated from the operating micro-controller. The buffer is used to provide a space to temporarily store data when a large number of data accessing operations are carried out.

BRIEF DESCRIPTION OF THE DRAWINGS

These and other features, aspects and advantages of the present invention will become better understood with regard to the following description, appended claims and accompanying drawings, where:

DESCRIPTION OF THE PREFERRED EMBODIMENTS

Figure 1:
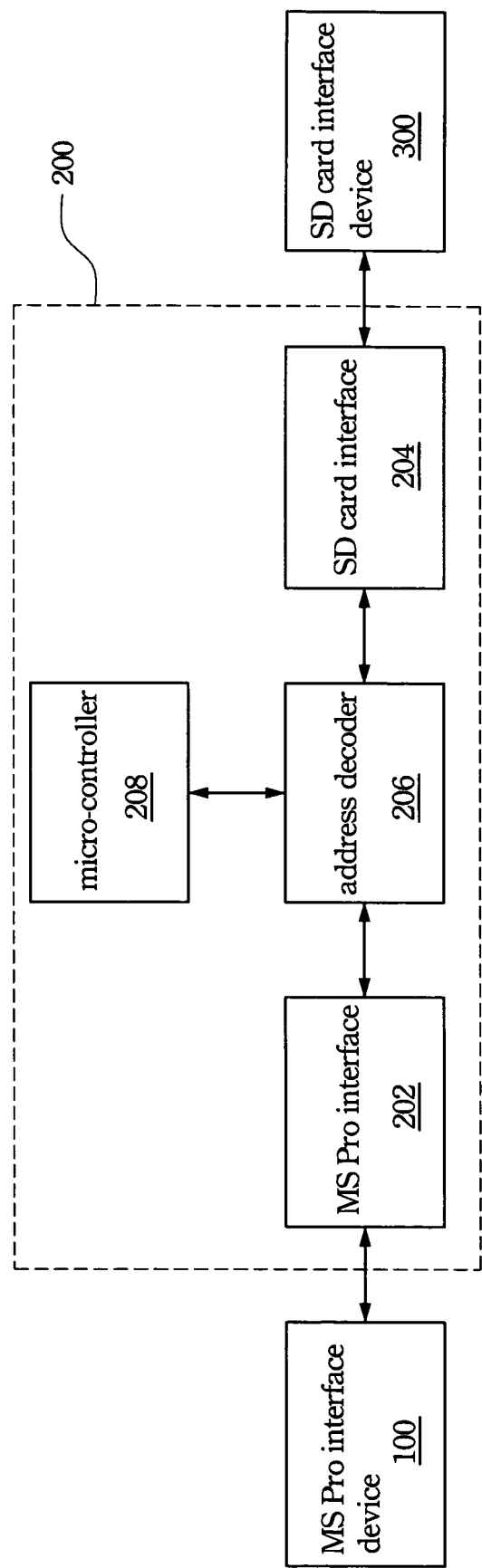
FIG. 1 is a framework of the memory card interface converting apparatus according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

Secure Digital (SD) card and Memory Stick Pro (MS Pro) are two familiar miniature memory card standards, but the two miniature memory cards have their own characteristics and are not compatible with each other. Hence, if a user has both an electronic device with an SD card interface and an electronic device with an MS Pro interface, the user will use more money to purchase both a SD card and a MS Pro. Therefore, the major purpose of the present invention is to provide an apparatus that is able to mutually convert the SD card standard and the MS Pro standard so that one of these two miniature memory cards can be used in both electronic devices with a SD card interface and electronic devices with a MS Pro interface. Thus, the user can use less money when purchasing a memory card.

FIG. 1 shows a memory card interface converting framework 200 comprising a MS Pro interface 202, a SD card interface 204, an address decoder 206 and a micro-controller 208. The MS Pro interface 202 and the SD card interface 204 are used to respectively connect to an electronic device with a MS Pro interface (MS Pro interface device 100) and an electronic device with a SD interface (SD card interface device 300).

Figure 2:
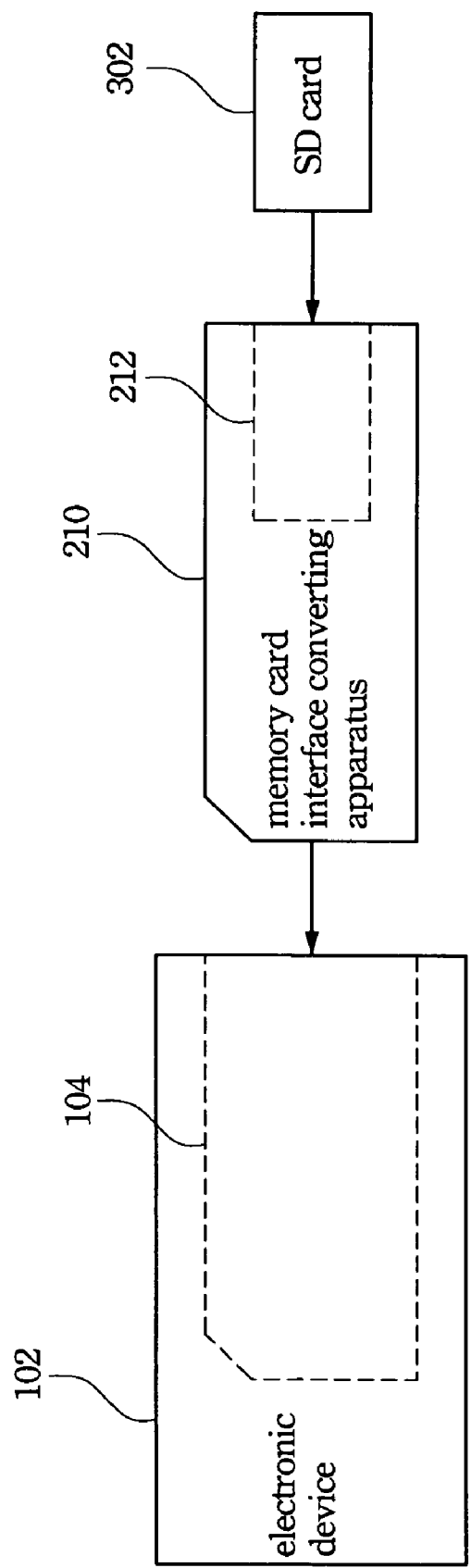
FIG. 2 is a diagram of an application of the present invention.

Referring to FIG. 1 and FIG. 2. In FIG. 2 the MS Pro interface device 100 in FIG. 1 is an electronic device 102, such as a digital camera or a PDA, with a MS Pro interface slot 104, and the SD card interface device 300 in FIG. 1 is a SD card 302 in FIG. 2. Thus, when a memory card interface converting apparatus 210 with the memory card interface converting framework 200 and a SD card interface slot 212 is used to convert interface signal standards between the electronic device 102 and the SD card 302, the SD card 302 can be used in the electronic device 102, and since MS Pro are more expensive than SD cards, the cost of purchasing a memory module can be reduced.

In this embodiment, when the MS Pro interface device 100 desires to access data in the SD card interface device 200 via the converting framework 200, the memory address needed for data access is first sent to the address decoder 206 via the MS Pro interface 202 in the converting framework 200. The memory address should be a MS Pro memory address according to the MS Pro standard herein; therefore, the MS Pro memory address should be transmitted to the micro-controller 208 by the address decoder 206, and the micro-controller 208 converts the MS Pro memory address into a corresponding SD card memory address according to the SD card standard. Next, the SD card memory address is returned to the address decoder 206, and the address decoder 206 can access the data in the SD card interface device 300 via the SD card interface 204 according to the SD card memory address.

Similarly, when the SD card interface device 300 desires to access the data in the MS Pro interface device 100, the data access flow is identical with the foregoing description.

Figure 3:
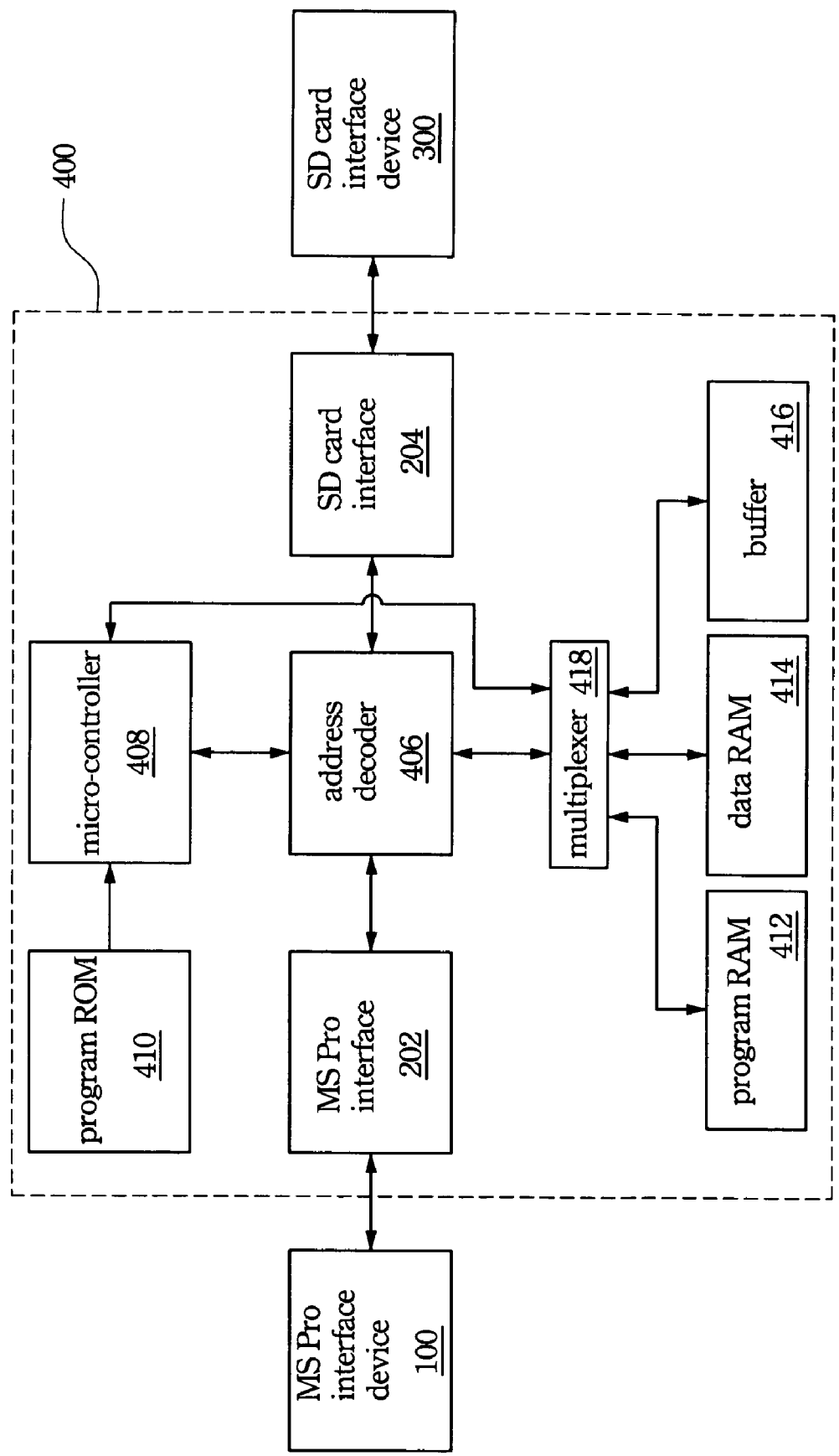
FIG. 3 is a framework of the memory card interface converting apparatus according to another embodiment of the present invention.

The converting framework 200 shown in FIG. 1 is an embodiment according to the basic concept of the present invention, but a converting framework 400 shown in FIG. 3 may be more practical.

The converting framework 400 also comprises the MS Pro interface 202 and the SD card interface 204 used in the converting framework 200, and further comprises an address decoder 406, a micro-controller 408, a program read only memory (program ROM) 410, a program random access memory (program RAM) 412, a data RAM 414 and a buffer 416.

In practice, the micro-controller 408 in the converting framework may be a single chip microprocessor such as an 8051; therefore, the storage unit storing the operating system in the micro-controller 408 may be taken out to be the independent program ROM 410. The program ROM is used to store and provide the code needed for the operation of the micro-controller 408. The operations of the micro-controller 408 and the micro-controller 208 shown in FIG. 1 are identical, that is, both the operations are mutually converting the format of memory address between the MS Pro interface 202 and the SD card interface 204. Thus, a conversion program used to convert the format of the memory address is stored in the program ROM 410. One advantage of the independent program ROM 410 is that a larger space for storing programs can be provided, and the converting program can be easily refreshed and altered by changing the whole program ROM 410.

During micro-controller 408 operation large quantities of temporary codes and data may be generated, and the temporary and data may be frequently accessed by the micro-controller 408. If the temporary codes and data are stored in RAMs with a higher data accessing speed, that is, the program RAM 412 and data RAM 414, the efficiency of the conversion framework 400 can be effectively improved.

Furthermore, the operations of the address decoder 406 and the address decoder 206 shown in FIG. 1 are identical, that is, both the address decoder 406 and the address decoder 206 are used to transfer the data between the MS Pro interface 202 and the SD card interface 204. The buffer 416 enables the decoder 406 to access large quantities of data and accommodate different the data transmission rates for both the MS Pro interface 202 and SD card interface. Assuming that the data transmission rate of the MS Pro interface 202 is higher than the data transmission rate of the SD card interface 204, when the MS Pro interface 202 transmits data to the SD card interface 204, the buffer 416 can be used to temporarily store the data which can not be immediately received by the SD card interface 204. The data stored in the buffer 416 can then be received by the SD card interface 204 at the data transmission rate of the SD card interface 204. Thus, data transfer efficiency will not be reduced by the obstruction of data flow. Similarly, the buffer 416 can also be used when the SD card interface 204 transmits data to the MS Pro interface 202.

In the framework 400, the program ROM 410 is read by the micro-controller 408. Both the program RAM 412 and the data RAM 414 are accessed by the micro-controller 408, and the buffer 416 is accessed by the address decoder 406. Therefore, a multiplexer 418 connected to the micro-controller 408, the address decoder 406, the program RAM 412, the data RAM 414 and the buffer 416 may be used to simplify the circuit in the converting framework 400. The multiplexer 418 can be used as a common bus so that the micro-controller 408 can selectively access the program RAM 412 or the data RAM 414, and the address decoder 406 can selectively access the buffer 416.

The Multi Media Card (MMC) framework and interface standard is compatible with the SD card. Therefore, a MMC interface and MMC interface device may be used instead of the SD card interface and SD card interface device in another embodiment of the present invention.

Many different versions of memory card interface standard are evolved from the SD card interface standard and the MMC interface standard, such as the micro SD card and mini SD card standards evolved from the SD card standard, and the Reduced Size (RS) MMC and micro MMC standards evolved from MMC standard. However, all these standards are compatible with the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory card interface converting apparatus, comprising:
   a Memory Stick Pro (MS Pro) interface exposed pin used to insert into a Memory Stick Pro interface slot of an electronic device to provide a first MS Pro memory address according to a MS Pro signal standard;
   a Secure Digital (SD) card interface slot used to install a Secure Digital memory card;
   a micro-controller used to convert the first MS Pro memory address into a second SD memory address according to the SD card signal standard; and
   an address decoder used to carry out a data accessing operation on the Secure Digital memory card according to the second SD memory address via the SD memory card interface slot.

2. The memory card interface converting apparatus as claimed in claim 1, wherein the SD card interface slot is a micro SD card interface slot or a Mini SD card interface slot.

3. The memory card interface converting apparatus as claimed in claim 1, wherein the SD card interface slot is compatible with a Multi Media Card (MMC) interface slot.

4. The memory card interface converting apparatus as claimed in claim 3, wherein the MMC interface slot is a Reduced Size (RS) MMC interface slot or a micro MMC interface slot.

5. The memory card interface converting apparatus as claimed in claim 1, further comprising a program read only memory (program ROM) used to provide a program needed by the micro-controller.

6. The memory card interface converting apparatus as claimed in claim 1, wherein the micro-controller is an 8051 single chip microprocessor.

7. The memory card interface converting apparatus as claimed in claim 1, further comprising a program random access memory (program (RAM) and a data random access memory (data RAM) used to respectively store temporary code and temporary data generated from the micro-controller.

8. The memory card interface converting apparatus as claimed in claim 7, further comprising a buffer used to temporarily store data accessed by the address decoder.

9. The memory card interface converting apparatus as claimed in claim 8, further comprising a multiplexer, wherein the micro-controller and the address decoder can selectively access the program RAM, the data RAM or the buffer via the multiplexer.

10. A memory unit used in an electronic device having a Memory Stick Pro (MS Pro) interface slot, the memory unit comprising:
    a Memory Stick Pro (MS Pro) interface exposed pin used to insert into the Memory Stick Pro interface slot of the electronic device so that the electronic device can provide a first MS Pro memory address according to a MS Pro signal standard via the MS Pro Interface exposed pin;
    a Secure Digital (SD) card interface slot used to install a Secure Digital memory card connect to a SD card;
    a micro-controller used to convert the first MS Pro memory address into a SD memory address according to a second SD card signal standard;
    an address decoder used to access data in the SD card according to the second SD memory address via the SD memory card interface slot;
    a program read only memory (program ROM) used to provide a program needed by the micro-controller;
    a program random access memory (program RAM) used to store a temporary code generated from the micro-controller;
    a data random access memory (data RAM) used to store a temporary data generated from the micro-controller; and
    a buffer used to temporarily stare the data accessed by the address decoder.

11. The memory unit as claimed in claim 10, wherein the SD card interface slot is a micro SD card interface slot or a Mini SD card interface slot.

12. The memory unit as claimed in claim 10, wherein the SD card interface slot is compatible with a Multi Media Card (MMC) interface slot.

13. The memory unit as claimed in claim 12, wherein the MMC interface slot is a Reduced Size (RS) MMC interface slot or a micro MMC interface slot.

14. The memory unit as claimed in claim 10, wherein the electronic device is a digital camera or a personal digital assistant (PDA).

15. The memory unit as claimed in claim 10, further comprising a multiplexer, wherein the micro-controller and the address decoder can selectively access the program RAM, the data RAM or the buffer via the multiplexer.

16. The memory unit as claimed in claim 10, wherein the micro-controller is an 8051 single chip microprocessor.

* * * * *